US008642203B2

(12) United States Patent
Joswig et al.

(10) Patent No.: US 8,642,203 B2
(45) Date of Patent: Feb. 4, 2014

(54) ROUND CELL BATTERY INCLUDING DISSIPATION ELEMENT AND INSULATING THERMOPLASTIC ELASTOMER

(75) Inventors: Ralf Joswig, Buchholz (DE); Helge Brenner, Hannover (DE); Markus Hoh, Wunstorf (DE); Martin Wiegmann, Borstel (DE)

(73) Assignee: Johnson Controls Hybrid And Recycling GmbH, Hannover (DE)

( * ) Notice: Subject to any disclaimer, the term of this patent is extended or adjusted under 35 U.S.C. 154(b) by 140 days.

(21) Appl. No.: 12/980,826

(22) Filed: Dec. 29, 2010

(65) Prior Publication Data

US 2011/0151304 A1    Jun. 23, 2011

Related U.S. Application Data

(63) Continuation-in-part of application No. PCT/EP2009/004412, filed on Jun. 18, 2009.

(30) Foreign Application Priority Data

Jul. 3, 2008    (DE) .......................... 10 2008 031 175

(51) Int. Cl.
*H01M 2/24*    (2006.01)
*H01M 6/42*    (2006.01)
*H01M 10/50*    (2006.01)

(52) U.S. Cl.
USPC ........... 429/120; 429/149; 429/156; 429/158; 429/159

(58) Field of Classification Search
USPC .......................... 429/120, 149, 156, 158, 159
See application file for complete search history.

(56) References Cited

U.S. PATENT DOCUMENTS

| 6,512,347 | B1 | 1/2003 | Hellmann et al. |
| 2002/0064707 | A1 | 5/2002 | Wessman |
| 2002/0125860 | A1 | 9/2002 | Schworm et al. |
| 2003/0013009 | A1 | 1/2003 | Dansui et al. |

(Continued)

FOREIGN PATENT DOCUMENTS

| DE | 102 23 782 A1 | 12/2003 |
| DE | 10 2004 005 394 A1 | 8/2005 |

(Continued)

OTHER PUBLICATIONS

International Search Report for Application No. PCT/EP2008/008712, mail date Feb. 4, 2009, 4 pages.

(Continued)

*Primary Examiner* — Sean P Cullen
(74) *Attorney, Agent, or Firm* — Foley & Lardner LLP

(57) ABSTRACT

A round cell rechargeable battery includes a plurality of round cells arranged next to one another and a dissipation element that is electrically insulated from the round cells and connects a group of round cells in thermally-conductive fashion so as to dissipate heat. The dissipation element is in the form of a rod and is bent in such a way that it runs in zigzag fashion alternately in each case along a lower side, an adjoining side wall, and an upper side of the round cells. The battery also includes an electrically-insulating, thermally-conductive, rubber-elastic thermoplastic elastomer, which is arranged at least partially between the dissipation element and the round cells to insulate the dissipation element electrically from the round cells and to dissipate heat from the round cells to the dissipation element.

18 Claims, 7 Drawing Sheets

(56) References Cited

U.S. PATENT DOCUMENTS

| | | |
|---|---|---|
| 2003/0017383 A1 | 1/2003 | Ura et al. |
| 2007/0259261 A1* | 11/2007 | Rejman et al. ............... 429/158 |
| 2008/0305388 A1* | 12/2008 | Haussman .................. 429/120 |
| 2009/0004557 A1 | 1/2009 | Lasarov et al. |
| 2009/0023056 A1 | 1/2009 | Adams et al. |
| 2010/0266886 A1 | 10/2010 | Joswig et al. |

FOREIGN PATENT DOCUMENTS

| | | |
|---|---|---|
| DE | 10 2004 043 829 A1 | 3/2006 |
| DE | 10 2007 009 315 A1 | 8/2007 |
| DE | 10 2007 052 330 A1 | 5/2009 |
| DE | 10 2008 031 175 A1 | 1/2010 |
| EP | 0 917 230 B1 | 10/1998 |
| EP | 1 191 616 A1 | 3/2002 |
| EP | 1 237 209 A1 | 9/2002 |
| EP | 1 274 137 B1 | 9/2008 |
| EP | 1 990 849 A1 | 11/2008 |
| WO | WO2006/124663 A2 | 11/2006 |
| WO | WO2009/040200 A1 | 4/2009 |
| WO | WO2009/056224 A1 | 5/2009 |
| WO | WO2010/000393 A1 | 1/2010 |

OTHER PUBLICATIONS

International Preliminary Report on Patentability for International Application No. PCT/EP2008/008712, mail date May 14, 2010, 7 pages.

International Preliminary Report on Patentability for International Application No. PCT/EP2009/004412, mail date Jan. 13, 2011, 20 pages.

Notice of Allowance in U.S. Appl. No. 12/769,582 mailed Apr. 16, 2013.

* cited by examiner

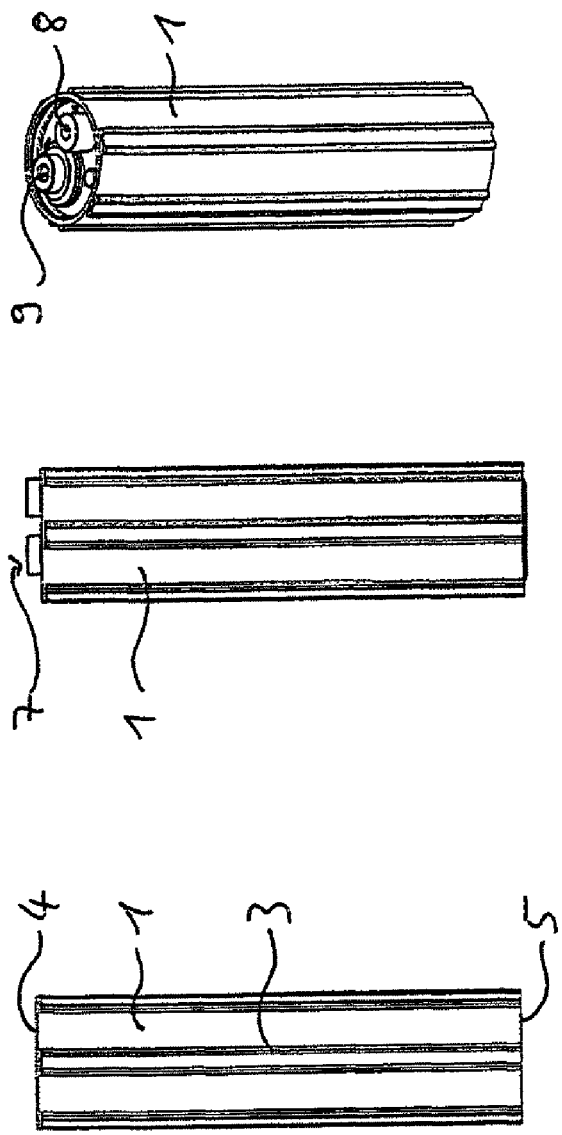

ROUND CELL BATTERY INCLUDING DISSIPATION ELEMENT AND INSULATING THERMOPLASTIC ELASTOMER

CROSS-REFERENCE TO RELATED PATENT APPLICATIONS

This application is a Continuation-in-Part of International Application PCT/EP2009/004412, filed Jun. 18, 2009, which claims priority to and the benefit of German Patent Application DE 10 2008 031 175.8, filed Jul. 3, 2008. The disclosures of International Application PCT/EP2009/004412 and German Patent Application DE 10 2008 031 175.8 are incorporated herein by reference in their entireties.

BACKGROUND

The present application relates to a round cell rechargeable battery. More specifically, the present application relates to a battery that includes an element for dissipating heat from a plurality of cells in the battery.

EP 0 917 230 B1 has disclosed a rechargeable battery with a temperature stabilizer.

DE 102 23 782 B4 has disclosed a battery with at least one electrochemical storage cell and a cooling device, through which a liquid cooling medium flows. The storage cells are accommodated in openings in the cooling devices and are partially in force-fitting contact with in each case one outer surface, which is curved in a direction perpendicular to the longitudinal axis of the storage cell. An expansion joint is provided in the regions of the force-fitting contact.

DE 10 2007 009 315 A1 has disclosed a device for cooling electrical elements with conductor bodies, which are in thermal contact with side faces of the electrical elements so as to dissipate heat.

In an electrical rechargeable battery with round cells, there is the problem of heat dissipation. This problem is intensified by the fact that the can of the cells are at an electrical potential.

It would be advantageous to provide an improved round cell rechargeable battery that better addresses this issue.

SUMMARY

An exemplary embodiment relates to a round cell rechargeable battery that includes a plurality of round cells arranged next to one another and a dissipation element that is electrically insulated from the round cells and connects a group of round cells in thermally-conductive fashion so as to dissipate heat. The dissipation element is in the form of a rod and is bent in such a way that it runs in zigzag fashion alternately in each case along a lower side, an adjoining side wall, and an upper side of the round cells. The battery also includes an electrically-insulating, thermally-conductive, rubber-elastic thermoplastic elastomer, which is arranged at least partially between the dissipation element and the round cells to insulate the dissipation element electrically from the round cells and to dissipate heat from the round cells to the dissipation element.

Another exemplary embodiment relates to a rechargeable battery comprising a plurality of round cells and a dissipation element that is electrically insulated from the round cells and connects a group of round cells in thermally-conductive fashion so as to dissipate heat. The dissipation element is in the form of a rod and runs in zigzag fashion along a lower side, an adjoining side wall, and an upper side of the round cells. The battery also includes a thermoplastic elastomer provided at least partially between the dissipation element and the round cells.

BRIEF DESCRIPTION OF THE DRAWINGS

FIG. 1 shows a jacket in the form of a flexible tube according to an exemplary embodiment.

FIG. 2 shows the jacket shown in FIG. 1 which has been drawn over a round cell according to an exemplary embodiment.

FIG. 3 shows a perspective view of the round cell and jacket shown in FIG. 2.

DETAILED DESCRIPTION

Figures 4, 5:
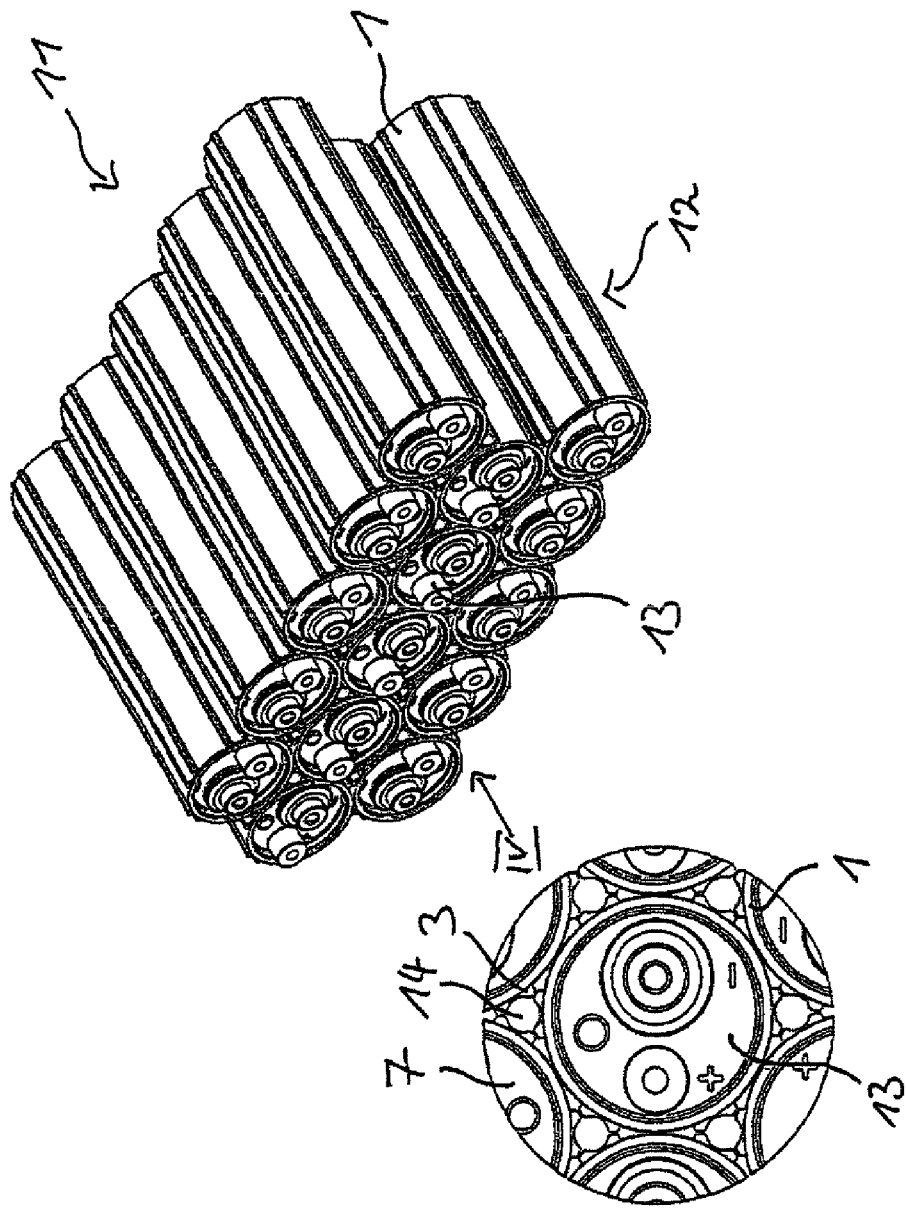
FIGS. 4 and 5 show a plurality of round cells arranged to form a stack or module according to an exemplary embodiment.

According to an exemplary embodiment, a round cell rechargeable battery includes a plurality of round cells arranged next to one another and a dissipation element that is electrically insulated from the round cells and connects a group of round cells in thermally-conductive fashion so as to dissipate heat. The dissipation element is in the form of a rod and is bent in such a way that it runs in zigzag fashion alternately in each case along a lower side, an adjoining side wall, and an upper side of the round cells. The battery also includes an electrically-insulating, thermally-conductive, rubber-elastic thermoplastic elastomer, which is arranged at least partially between the dissipation element and the round cells to insulate the dissipation element electrically from the round cells and to dissipate heat from the round cells to the dissipation element.

The dissipation receptacle elements arranged and designed in accordance with an exemplary embodiment described herein fulfill a plurality of functions.

Firstly, the thermoplastic elastomer provides the electrical insulation between the round cells and the dissipation elements, which are produced from copper, aluminum or steel, for example, and guide a suitable coolant. Suitable dissipation elements are in particular extruded parts. Suitable coolants are tetrafluoroethane (R134a) and carbon dioxide (R744), for example.

Secondly, the thermoplastic elastomer conducts the heat from the round cells to the dissipation elements, which transfer the heat to the coolant. Good thermal conduction is achieved if the thermoplastic elastomer has a thermal conductivity greater than one Watt per Kelvin-meter (i.e., >1 W/(mK)). Preferably, the thermal conductivity is greater than from two to three Watts per Kelvin-meter (i.e. >3 W/(mK)). Suitable thermoplastic elastomers are offered for sale by the company Cool Polymers, Inc., USA, under the designations CoolPoly® D8102 Thermally-conductive Thermoplastics Elastomer (TPE) and CoolPoly® D8104 Thermally-conductive Thermoplastics Elastomer (TPE).

Thirdly, the thermoplastic elastomer, owing to its rubber-elastic property, ensures good contact between the round cells and the dissipation elements. Air gaps which impair the thermal conduction from the round cells to the coolant are effectively avoided. In particular, the round cells being pressed against the dissipation elements during manufacture of the round cell rechargeable battery ensures that the heat transfer surfaces lie on one another in optimum fashion and air gaps are avoided. Thermoplastic elastomers with a Shore A hardness of from 20 to 100 have demonstrated good results in unofficial experiments.

In one embodiment, jackets in the form of flexible tubes and consisting of an electrically-insulating, thermally-conductive and rubber-elastic thermoplastic elastomer are provided, which have been drawn over the round cells. Dissipation receptacle elements can be arranged on the outer sides of the jackets. Preferably, six dissipation receptacle elements are provided on each jacket of an inner round cell and are arranged uniformly on the outer side, i.e. in 60° intervals. An inner round cell is surrounded completely by other round cells parallel to the longitudinal axis of said inner round cell, i.e. it is not at the edge of the round cell rechargeable battery. The jackets can be formed from the same material as the dissipation receptacle elements. In this case, the jackets and the dissipation receptacle elements are expediently designed to be integral.

In a further embodiment, the round cells are accommodated in at least one dissipation receptacle element, which is common to a group of round cells, said dissipation receptacle elements having a receiving contour which matches the side wall surfaces of the round cells, with the result that these side wall surfaces bear against the inner wall of an associated dissipation receptacle element, the dissipation receptacle elements furthermore having a receiving bore for receiving the rod-shaped dissipation elements. Preferably, the dissipation receptacle elements have cross sections which are triangular in the longitudinal direction and have concave sides. The dissipation receptacle elements in this case at the same time act as spacers between the round cells. Effective heat transfer between the round cells and the dissipation receptacle elements is achieved if those inner walls of the dissipation receptacle elements which adjoin the round cells are curved. Advantageously, the dissipation receptacle elements have notches, which protrude radially out of the receiving bore into the dissipation receptacle element. The notches improve the contact between the round cells and the dissipation receptacle elements, on the one hand, and the dissipation receptacle elements and the dissipation elements, on the other hand, when the round cell rechargeable battery is produced. In addition, the notches make it easier for the individual components to be joined together and therefore for the round cell rechargeable battery to be produced.

FIG. 1 shows a jacket 1 in the form of a flexible tube and consisting of a thermoplastic elastomer, which is electrically-insulating, has good thermal conductivity and is (rubber-)elastic. The upper detail in FIG. 1 illustrates a side view and the lower detail illustrates a plan view.

The jacket 1 has substantially the lateral surface shape of a circular cylinder. A longitudinal axis 2 coincides with the cylinder axis.

Six dissipation receptacle elements 3 are arranged on the outer surface of the jacket 1. The dissipation receptacle elements 3 are arranged at uniform distances from one another, i.e. at angular distances of 60 degrees.

The dissipation receptacle elements 3 are in the form of rods and extend from an upper side 4 to a lower side 5.

The dissipation receptacle elements 3 have curved cutouts 6 with a cross section in the form of a circular arc. These cutouts 6 act as guides for dissipation elements (not illustrated in FIG. 1) with cross sections in the form of circular cylinders.

FIG. 2 shows the jacket 1 shown in FIG. 1 which has been drawn over a round cell 7. The round cell 7 has a known design, and in particular has a positive electrode 8 and a negative electrode 9. The Figure also shows a degassing valve 10. Owing to the rubber-elasticity of the jacket 1, the jacket 1 sits firmly on the round cell 7.

FIG. 3 shows a perspective view of the situation shown in FIG. 2.

FIGS. 4 and 5 show a plurality of round cells 7 arranged to form a stack or module 11. FIG. 4 shows a partial view in the direction IV.

The stack 11 has three rows 12 each having five round cells 7. The rows 12 are arranged offset with respect to one another alternately through half a diameter of the round cells 7 perpendicular to the longitudinal direction 2 of the round cells 7. This arrangement enables dense packing of the round cells. The stack 11 is not complete. It comprises only some of all of the round cells 7 of a round cell rechargeable battery.

The round cells 7 each have a jacket 1. In each case six dissipation receptacle elements 3 are arranged uniformly on the outer side of the jackets 1. This is expedient since, with this packing density of the round cells 7, each round cell 7 has six directly adjacent round cells 7. This applies in any case to round cells 7 which are not at the edge of the round cell rechargeable battery (inner round cell). For example, round cell 13 is an inner round cell 7.

FIG. 4 shows dissipation elements 14. The dissipation elements 14 are each guided by three dissipation receptacle elements 3, each of these three dissipation receptacle elements 3 being associated with a different round cell 7. The dissipation elements 14 have a circular cross section. It can be seen that two adjacent round cells 7 are not in direct contact with one another, but are always separated from one another, in particular electrically insulated from one another, by two jackets 1.

Figure 6:
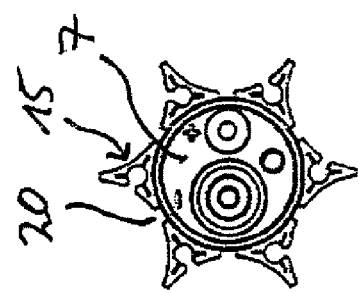
FIG. 6 shows a dissipation receptacle element according to an exemplary embodiment.

FIG. 6 shows another embodiment of a dissipation receptacle element 15.

The dissipation receptacle element 15 is in the form of a rod. It has a length which approximately corresponds to the length of the round cells 7. The dissipation receptacle element 15 has a triangular cross section perpendicular to the longitudinal axis 2 (i.e., when viewed in the direction of the longitudinal axis); this can be seen in the lower detail in FIG. 6. The dissipation receptacle element 15 has a receiving contour 16, which is matched to the side wall surfaces of the round cells 7 and comprises three circular arcs.

A receiving bore 17 as a guide for a dissipation element 14 with a circular cross section is provided in the center. Three notches 18 protrude radially out of the receiving bore 17 into the dissipation receptacle element 15. In addition, a slot 19 is provided in the receiving contour 16. Firstly, the dissipation element 14 can be introduced into the guide via the slot 19. Secondly, disruptive air slots during compression of the round cell rechargeable battery are avoided. The slot 19 therefore also acts as an expansion joint during the compression.

Figure 7:
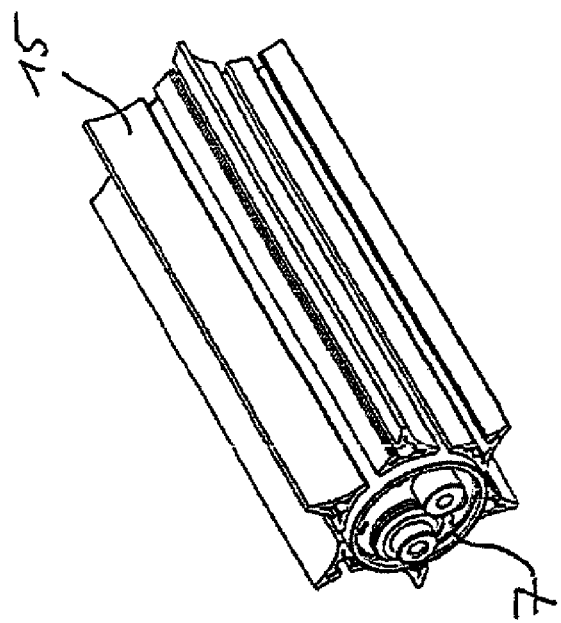
FIG. 7 shows a round cell with six dissipation receptacle elements arranged uniformly over the circumference thereof adjacent to the side wall surface according to an exemplary embodiment.

FIG. 7 shows the round cell 7, with six dissipation receptacle elements 15 arranged uniformly over the circumference thereof adjacent to the side wall surface. The dissipation receptacle elements 15 are not in contact with one another; this can be seen from the gaps 20.

Figure 8:
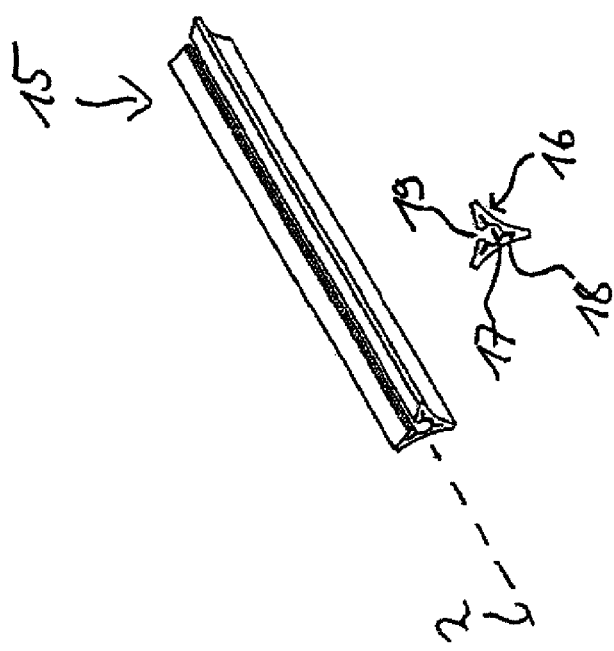
FIG. 8 shows a perspective view of the round cell of FIG. 7.

FIG. 8 shows a perspective view of FIG. 7.

Figure 9:
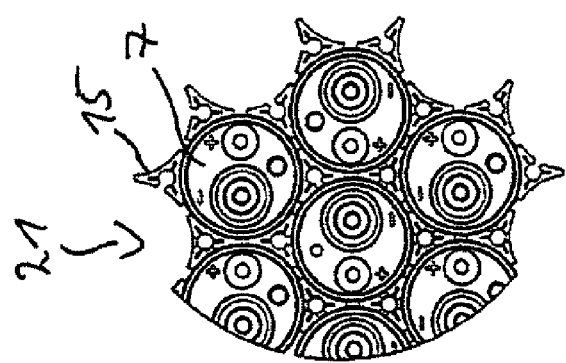
FIG. 9 shows a partial section through a stack or module of round cells with dissipation receptacle elements according to an exemplary embodiment.

FIG. 9 shows a partial section through a stack 21 of round cells 7 with the dissipation receptacle elements 15. It can be seen that the round cells 7 are not in contact with one another owing to the arrangement of the dissipation receptacle elements 15. Since the dissipation receptacle elements 15 are produced from electrically-insulating thermoplastic elastomer, the round cells 7 are insulated electrically from one another. The dissipation receptacle elements 15 are not connected to one another.

Figure 10:
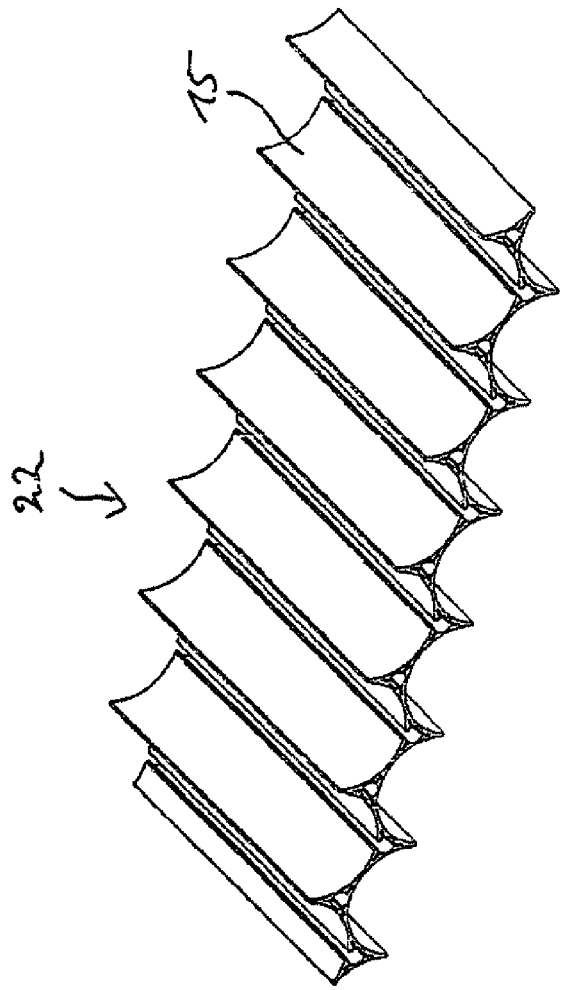
FIG. 10 shows an interlayer, which is formed from dissipation receptacle elements, according to an exemplary embodiment.

FIG. 10 shows an interlayer 22, which is formed from dissipation receptacle elements 15. The interlayer 22 consists of dissipation receptacle elements 15 arranged next to one another in a row. In each case two adjacent dissipation receptacle elements 15 are connected to one another. During the manufacture of the round cell rechargeable battery, the interlayer 22 is positioned between two adjacent rows 12 of round cells 7. The interlayer 22 provides the advantage of simple manufacture of the round cell rechargeable battery.

Figure 11:
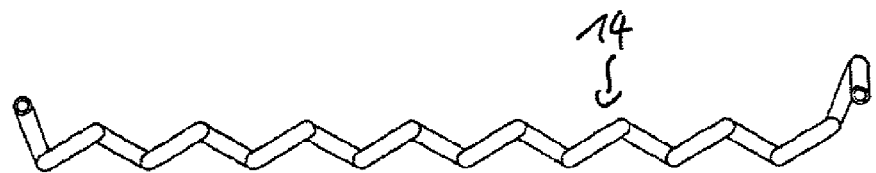
FIG. 11 shows a plan view of the dissipation element according to an exemplary embodiment.

FIG. 11 shows a plan view of the dissipation element 14, i.e. in the direction of the longitudinal axis 2.

Figure 12:
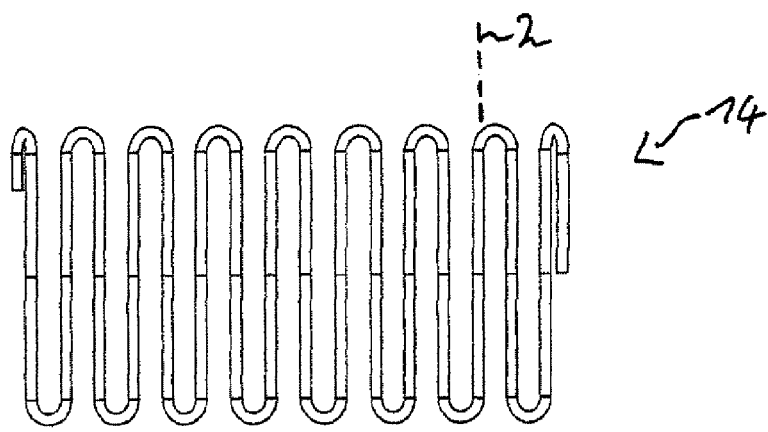
FIG. 12 shows a side view of the dissipation element shown in FIG. 11 perpendicular to the longitudinal axis.

FIG. 12 shows a side view of the dissipation element 14 shown in FIG. 11, i.e., perpendicular to the longitudinal axis 2.

Figure 13:
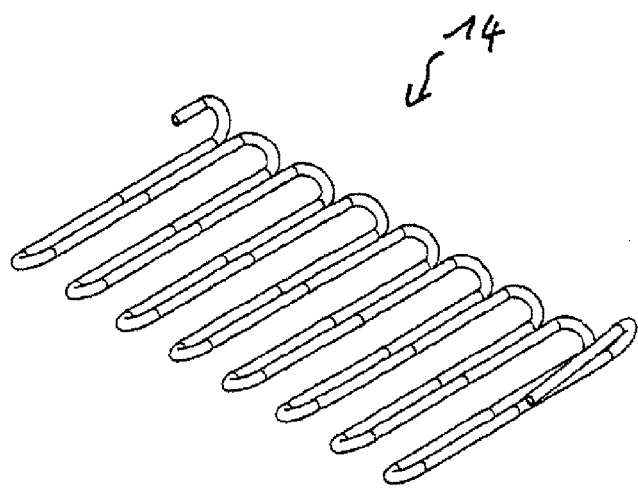
FIG. 13 shows a perspective view of the dissipation element shown in FIGS. 11 and 12.

FIG. 13 shows a perspective view of the dissipation element 14 shown in FIGS. 11 and 12.

It is apparent from FIGS. 11, 12 and 13 that the dissipation element 14 runs in zigzag fashion in three dimensions, i.e. an imaginary axis of the tubular dissipation element 14 describes a three-dimensional serpentine curve.

FIGS. 14 to 19 describe part of the fitting process for the round cell rechargeable battery.

Figure 14:
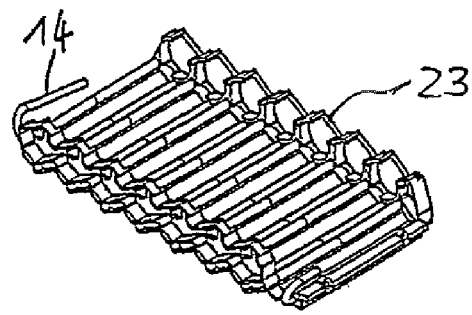
FIGS. 14 to 19 illustrate part of the fitting process for the round cell rechargeable battery according to an exemplary embodiment.

First, the dissipation element 14 is inserted into a plastic part 23 (FIG. 14).

Figure 15:
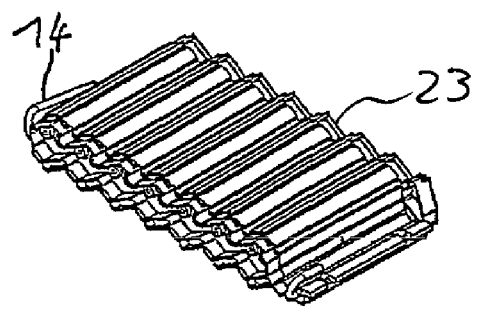
Figure 16:
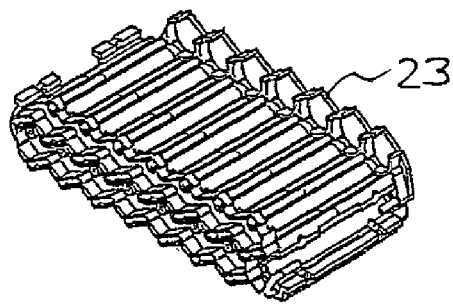
Figure 17:
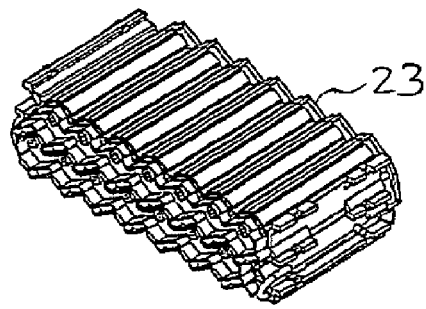
Figure 18:
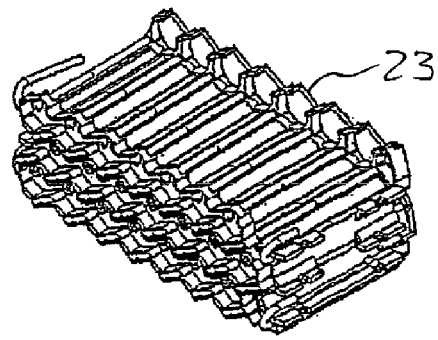

Then, the round cells 7, which have been provided with the jacket 1 and the dissipation receptacle elements 3, are positioned onto the dissipation element 14 in such a way that the dissipation element 14 is guided in the cutouts 6 in the dissipation receptacle elements 3 (FIG. 15).

The procedures from FIGS. 14 and 15 are repeated until a sufficient number of rows of round cells 7 has been formed.

Figure 19:
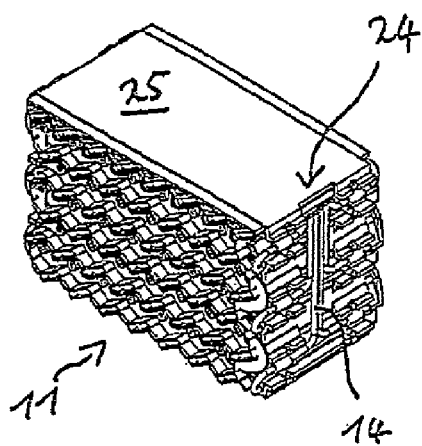

It can be seen from FIG. 19 that the individual dissipation elements 14 are brought together at one end 24 of the stack 11. They can be connected with a collector (not illustrated).

The round cell rechargeable battery is compressed via two mutually opposite terminating plates 25, of which only one is shown. An optimum assembly of components for heat transfer is thus ensured.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the battery and its features as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A rechargeable battery comprising:
    a plurality of round cells;
    a dissipation element that is electrically insulated from the round cells and connects a group of round cells in thermally-conductive fashion so as to dissipate heat, wherein the dissipation element is in the form of a rod that runs along a lower side, an adjoining side wall, and an upper side of the round cells in a zigzag fashion; and
    a thermoplastic elastomer provided at least partially between the dissipation element and the round cells.

2. The rechargeable battery of claim 1, wherein the thermoplastic elastomer is configured to electrically insulate the dissipation element from the round cells and to dissipate heat from the round cells to the dissipation element.

3. The rechargeable battery of claim 1, further comprising jackets in the form of flexible tubes drawn over the round cells, each of the jackets formed of the thermoplastic elastomer.

4. The rechargeable battery of claim 3, further comprising dissipation receptacle elements arranged on outer surfaces of the jackets.

5. The rechargeable battery of claim 1,
wherein the round cells are held in at least one dissipation receptacle element comprising the thermoplastic elastomer which is common to the group of round cells,
wherein the dissipation receptacle element comprises a receptacle contour that matches the side walls of the round cells, and
wherein the side walls bear against an inner wall of an associated dissipation receptacle element.

6. The rechargeable battery of claim 5, wherein the dissipation receptacle element comprises a receiving bore for receiving the rod-shaped dissipation elements.

7. The rechargeable battery of claim 6, wherein the dissipation receptacle element comprises notches that protrude radially out of the receiving bore into the dissipation receptacle element.

8. The rechargeable battery of claim 5, wherein the inner walls of the dissipation receptacle element that adjoins the round cells are curved.

9. The rechargeable battery of claim 5, wherein the thermoplastic elastomer has a thermal conductivity greater than one watt per Kelvin-meter (>1 W/(mK)).

10. The rechargeable battery of claim 1, wherein the thermoplastic elastomer has a Shore A hardness of between 20 and 100.

11. A round cell rechargeable battery comprising:
a plurality of round cells arranged next to one another;
a dissipation element that is electrically insulated from the round cells and connects a group of round cells in thermally-conductive fashion so as to dissipate heat, wherein the dissipation element is in the form of a rod and is bent in such a way that the rod runs along a lower side, an adjoining side wall, and an upper side of the round cells in a zigzag fashion; and
an electrically-insulating, thermally-conductive, rubber-elastic thermoplastic elastomer, which is arranged at least partially between the dissipation element and the round cells to insulate the dissipation element electrically from the round cells and to dissipate heat from the round cells to the dissipation element.

12. The round cell rechargeable battery of claim 11, further comprising jackets in the form of flexible tubes drawn over the round cells, the jackets comprising the electrically-insulating, thermally-conductive, rubber-elastic thermoplastic elastomer.

13. The round cell rechargeable battery of claim 12, further comprising dissipation receptacle elements arranged on outer surfaces of the jackets.

14. The round cell rechargeable battery of claim 11,
wherein the round cells are held in at least one dissipation receptacle element comprising the electrically-insulating, thermally-conductive, rubber-elastic thermoplastic elastomer which is common to the group of round cells,
wherein the dissipation receptacle element comprises a receptacle contour that matches the side walls of the round cells,
wherein the side walls bear against an inner wall of an associated dissipation element, and
wherein the dissipation receptacle element comprises a receiving bore for receiving the rod-shaped dissipation elements.

15. The round cell rechargeable battery of claim 14, wherein the inner walls of the dissipation receptacle element that adjoins the round cells are curved.

16. The round cell rechargeable battery of claim 14, wherein the dissipation receptacle element comprises notches that protrude radially out of the receiving bore into the dissipation receptacle element.

17. The round cell rechargeable battery of claim 11, wherein the thermoplastic elastomer has a thermal conductivity greater than one watt per Kelvin-meter (>1 W/(mK)).

18. The round cell rechargeable battery of claim 11, wherein the thermoplastic elastomer has a Shore A hardness of between 20 and 100.

* * * * *